United States Patent [19]

Umemoto et al.

[11] Patent Number: 4,563,492

[45] Date of Patent: Jan. 7, 1986

[54] RESINOUS COMPOSITION WHICH IS USEFUL FOR THE DISPERSION DIFFICULTY DISPERSIBLE COLORING MATTER

[76] Inventors: Hirotoshi Umemoto, 138-97 Oneo, Hirono-cho, Uji-shi, Kyoto-fu; Hisaki Tanabe, B-40, 1-508 Ishishiro, Otokoyama, Yawata-shi, Kyoto-fu; Akihiro Kanakura, 25-22-405, Shakusonji-cho, Hirakata-shi, Osaka-fu; Shinji Nakano, 95-401 Tonda-danchi, 1319, Makita-cho, Osaka-fu, Takatsuki-shi, all of Japan

[21] Appl. No.: 574,963

[22] Filed: Jan. 30, 1984

[30] Foreign Application Priority Data

Jan. 29, 1983 [JP] Japan .................................. 58-13207

[51] Int. Cl.$^4$ .......................... C08L 67/08; C08K 5/34
[52] U.S. Cl. ...................................... 524/90; 525/123; 525/127; 525/162; 525/424; 525/425; 525/428; 525/440; 525/443
[58] Field of Search ............... 525/443, 162, 123, 440, 525/424, 425, 428, 127; 106/308 M; 524/90

[56] References Cited

U.S. PATENT DOCUMENTS

| 4,048,252 | 9/1977 | Behmel et al. ....................... 525/443 |
| 4,308,188 | 12/1981 | Wicks et al. ..................... 525/380 X |
| 4,442,248 | 4/1984 | Kanda et al. ......................... 523/414 |

FOREIGN PATENT DOCUMENTS

| 1123303 | 8/1968 | United Kingdom . |
| 1411568 | 10/1975 | United Kingdom . |
| 1455353 | 11/1976 | United Kingdom . |
| 1561277 | 2/1980 | United Kingdom . |
| 1586911 | 3/1981 | United Kingdom . |
| 1587210 | 4/1981 | United Kingdom . |
| 1593790 | 7/1981 | United Kingdom . |
| 1596057 | 8/1981 | United Kingdom . |

OTHER PUBLICATIONS

Abstract of JP154210 dtd 09/03/82, Umemoto et al.

*Primary Examiner*—Theodore E. Pertilla
*Attorney, Agent, or Firm*—Wenderoth, Lind & Ponack

[57] ABSTRACT

A resinous composition for coating use comprising an amphoteric resin having an acidic resinous component and a basic component of a basic compound, and an amino-formaldehyde resin etherified with monohydric alcohol having 1 to 4 carbon atoms and/or isocyanate compound, which is characterized by the fact that the basic component of a said amphoteric resin consists of a basic compound whose titration midpoint potential in non-aqueous potentiometric titration, when incorporated into the resin, is less than 450 mV, and the basicity of the amphoteric resin is within the range of $1.0 \times 10^{-2}$ to 1.0 m mol/g solid. This composition can exhibit excellent pigment dispersibility and is useful as resinous vehicle for a coating composition to be used as a top coat for automobile bodies and the like.

5 Claims, No Drawings

RESINOUS COMPOSITION WHICH IS USEFUL FOR THE DISPERSION DIFFICULTY DISPERSIBLE COLORING MATTER

FIELD OF INVENTION

The present invention relates to a resinous composition for coating use having an excellent pigment dispersibility, comprising an amphoteric resin and an amino-formaldehyde resin and/or isocyanate compound.

BACKGROUND OF THE INVENTION

An amphoteric resin composed of an acidic resinous component such as oil-free polyester resin, alkyd resin, acrylic resin and the like, and a basic resinous component such as urea resin, melamine resin, polyamide resin, polyurethane resin and their prepolymers and/or a basic compound as hydroxylamines, amino acids, primary or secondary amine compounds and the like, possess, in its molecule, both the characteristics of the and basic groups and therefore, such a resin can exhibit excellent compatibility with a number of resins customarily used for the preparation of coating compositions and good affinity toward various types of pigments. For these reasons, it is being watched with keen interest as general purpose resin.

The combination of amphoteric resin and etherified amino-formaldehyde resin and/or isocyanate compound is characterized by having excellent compatibility with other coating resins, improved coating workability, finishing appearance (gloss, glamorous) and weather resistance, and hence is superior in many points to the aminoalkyd or aminoacrylic resin type paints heretofore used as top coats for automobile bodies and the like.

The present inventors have previously found that a coating composition comprising an amphoteric resin obtained by the reaction of polyester resin, 10 to 80 mole % of the acid component being composed of saturated alicyclic polycarboxylic acid and 10 to 100 mole % of the carboxyl groups capable of developing resinous acid value being derived from the polycarboxylic acid which will give a titration midpoint potential in non-aqueous potentiometric titration when developing a resinous acid value, of more than $-350$ mV, and a basic compound, and amino-formaldehyde resin etherified with $C_1$ to $C_4$ monohydric alcohol can exhibit excellent weather resistance, mechanical properties of the coating, interlaminar adhesion, curability and pigment dispersibility and is especially useful as a top coat for automobile bodies and the like. This is the subject of Japanese Patent Application No. 154210/82. The disclosed invention, while making the most of the merits possessed by polyester resin as weather resistance, mechanical properties of the coating, interlaminar adhesion and the like, seeks to overcome the drawbacks of the prior art such as poor compatibility with amino resin, by the adoption of amphoterization, thereby providing an excellent coating composition for top coat use. Since the resinous composition contains the above-mentioned amphoteric resin, fairly good results are obtained even in respect of pigment dispersibility, too. Such effect can never be attained with the mere mixture of acidic resin and a basic compound.

However, the subsequent studies revealed that even with the aforesaid resinous composition, when use was made of the so-called hard dispersible pigments having a quinacridone structure as Cinquacia red and the like, no satisfactory results could be obtained, often resulting in gloss down, blushing and the like, and that such pigment dispersibility problem was significantly related to the kind and amount of basic resin and/or basic compound contained in the amphoteric resin. The present invention has been made during the course of such studies.

SUMMARY OF THE INVENTION

A major object of the present invention is, therefore, to provide a resinous composition for coating use, having an exceptionally improved pigment dispersibility. More specifically, the invention seeks to provide a resinous composition for coating use which is useful as a top coat for automobile bodies and the like, and capable of showing excellent dispersion stability to hard dispersible pigments liable to cause blushing, gloss down or the like, not to mention the desired coating workability and various other film performances.

The abovesaid objects of the invention can be attained by the following compositions.

(1) A resinous composition for coating use having a greatly improved pigment dispersibility and comprising an amphoteric resin having an acidic resinous component and a basic component of a basic compound, and amino-formladehyde resin etherified with monohydric alcohol having 1 to 4 carbon atoms and/or isocyanate compound, which is characterized by the fact that the basic component of said amphoteric resin consists of a basic compound whose titration midpoint potential in non-aqueous potentiometric titration, when incorporated into resin, is less than 450 mV, and the basicity of the amphoteric resin is within the range of $1.0 \times 10^{-2}$ to 1.0 m mol/g solid.

(2) A resinous composition according to the preceeding para. (1) comprising 45 to 95% by weight of said amphoteric resin and 55 to 5% by weight of said amino-formaldehyde resin and/or isocyanate compound.

(3) A resinous composition according to anyone of the preceeding paragraphs wherein the acidic resinous component of the amphoteric resin consists of polycarboxylic acid whose titration midpoint potential in non-aqueous potentiometric titration, under the condition capable of developing resinous acid value, is more than $-350$ mV and the acidity of said amphoteric resin is within the range of $2.0 \times 10^{-2}$ to 3.0 m mol/g solid.

DESCRIPTION OF THE SPECIFIC EMBODIMENTS

In the present invention, there is used an amphoteric resin, having both an acidic resinous component and basic component of basic compound. Therefore, the acidic resin may be any of the resins having a functional group capable of reacting with the functional group possessed by basic resin or basic compound, as for example, active hydrogen, active alkoxy or the group capable of reacting with the same, as well as an acidic group as, for example, carboxyl, sulfonic group or the like. Examples of such acidic resins are oil-free polyester resin, alkyd resin, acrylic resin and the like.

On the other hand, the basic compound may be any of the members having both a functional group capable of reacting with the functional group possessed by the acidic resin, such as, for example, a group which is reactive with active hydrogen or active alkoxy, or active hydrogen or active alkoxy group, and a basic group such as, for example, amino group, imino group and the like. Examples of such members are urea resin, melamine resin, polyamide resin, polyurethane resin, hydroxylamine, aminoacids, primary or secondary amines and the like.

Among the amphoteric resins prepared by the reaction of such acidic resin and basic compound, the invention intends to use the specific members whose basic components are such basic resins and/or basic compounds as each having a titration midpoint potential in non-aqueous potentiometric titration, when incorporated into the resin, of less than 450 mV and whose basicity is within the range of $1.0 \times 10^{-2}$ to 1.0 m mol/g solid. An amphoteric resin is in general insoluble in water.

Therefore, the inventors have developed specific methods for the determination of acidity and basicity of such resin. That is, a test resin is first dissolved in pyridine, a non-aqueous potentiometric titration is carried out with a titer of n-tetrabutylammonium hydroxide, and the resinous acidity is calculated from the molar volume of the titer required for the neutralization thereof. As to the basicity, the test resin is dissolved in acetic acid, a non-aqueous potentiometric titration is carried out with a titer of perchloric acid and the basicity is calculated from the molar volume of the titer required for the neutralization thereof.

The inventors have then studied the correlation between the pigment dispersibility of the resinous composition and the acidity and basicity of the amphoteric resin to be contained therein.

As a result of a series of studies, the inventors have found that for the dispersion of common pigments, fairly good results can be obtained with the amphoteric resins having comparatively wider range of acidity, e.g. 3.0 to $2.0 \times 10^{-2}$ m mol/g solid and of basicity, e.g. 1.0 to $5 \times 10^{-3}$ m mol/g solid, and however, for the hard dispersible pigments having quinacridone structure as Cinquacia red and the like, no satisfactory results can be obtained with the aforesaid amphoteric resins, paying regard only to the acidity and basicity thereof, and that in the latter case, the pigment dispersibility is greatly influenced by the types and amounts of the constituent members of the amphoteric resins and especially of the basic components thereof. That is, for obtaining a stable dispersion of such hard dispersible pigment, it is essential to incorporate into an amphoteric resin, a basic resin and/or basic compound having a titration midpoint potential in non-aqueous potentiometric titration under the state incorporated into resin, of less than 450 mV, in an amount such as to give the resin a basicity of $1.0 \times 10^{-2}$ to 1.0 m mol/g solid. It has also been found that the kind of acidic component is not so important providing giving an appropriate acidity to the amphoteric resin.

Examples of basic resins and/or basic compounds each having a titration midpoint potential in non-aqueous potentiometric titration, when incorporated into resin, of less than 450 mV are polyethyleneimine, triethanolamine, diethanolamine, N-methyl diethanol amine, N,N-dibutylethanol amine, N,N-diethylethanolamine, N,N-dimethylethanolamine, N,N-diisopropylethanolamine, N-methyl-3-piperidine methanol, 3-pyridine methanol and the like.

The other component of the present resinous composition is an amino-formaldehyde resin and/or isocyanate compound. Examples of such resins and/or compounds are melamine resin, guanamine resin, urea resin and the like, each etherified with monohydric alcohol having 1 to 4 carbon atoms, as methanol and ethanol. Among them, particular preference is given to melamine resin. As the isocyanate compounds, mention is made of aromatic polyisocyanates, alicyclic polyisocyannates, fatty acid modified polyisocyanates and the like. As to the weight ratio of said amphoteric resin and aminoformaldehyde resin and/or isocyanate compound, it is in general determined in the range of 45 to 95 parts by weight, preferably 60 to 80 parts by weight, of the former and 55 to 5 parts by weight, preferably 40 to 20 parts by weight, of the latter. However, they may be freely changed according to the intened objects of the composition formulated. The thus obtained resinous composition of the invention is quite useful for the preparation of top coat composition for automobile bodies and the like, because of excellent compatibility with other resins, excellent curability and extraordinarily improved pigment dispersibility. Though it is not essential in the invention, it has been found that when the amphoteric resin is composed of particular acidic resinous component based on the polycarboxylic acid showing a titration midpoint potential in nonaqueous potentiometric titration, under the condition capable of developing a resinous acid value, of more than $-350$ mV, the amount of said acid being selected so as to give the acidity of $2.0 \times 10^{-2}$ to 3.0 m mol/g solid, and the present basic component, the resinous composition thus obtained can affor by far the best pigment dispersibility, as well as excellent durability, finishing appearance, weather resistance, interlaminar adhesion, impact strength and the like. As to the preparation of the present amphoteric resin and advantages of using such resin, reference should be made to Japanese Patent Application No. 154210/82.

The invention shall be now more fully explained in the following Examples. Unless otherwise being stated, all parts are by weight.

EXAMPLE 1

Preparation of Amphoteric Resin Varnish I

Into a reaction tank fitted with heating device, stirrer, refluxing device, water separator, distilling tower and thermometer, were added 133 parts of isophthalic acid, 29.2 parts of adipic acid, 25.1 parts of trimethylolethane, 52.8 parts of neopentylglycol and 56 parts of 1,6-hexanediol and the mixture was heated. Stirring was commenced to start at the stage when the materials charged were dissolved and the tank temperature was raised to 220° C. At this time, from 160° to 220° C., said temperature was raised at a constant speed over 3 hours. The formed condensed water was removed out of the system. When the temperature reached to 220° C., the reaction mixture was maintained at the same temperature for 1 hour, added gradually with 5 parts of xylene as refluxing solvent and after switching to the condensation reaction in the presence of solvent, the reaction was continued. The reaction was over at the stage of resinous acid value of 8.0 and the mixture was allowed to cool. (Thus obtained acidic resin shall be referred as A). To the reaction mixture, were added at 140° C. 3.8 parts of triethanolamine and 0.13 part of FASCAT 4201 (M&T Chemicals Inc.) and an ester exchange reaction was effected at 160° C. until the characteristic spot of triethanolamine in TLC (thin layer chromatography) had disappeared. After cooling, 118.2 parts of xylene and 13.7 parts of cellosolve acetate were added to obtain an amphoteric resinous varnish I. The characteristics of this varnish are shown in Table 1.

EXAMPLE 2

Amphoteric Resinous Varnish II

To 100 parts of acidic resin A obtained in Example 1, were 1.3 parts of N-methyl-3-piperidinemethanol and 0.05 part of FASCAT4201 and an ester exchange reaction was carried out at 160° C. until the characteristic spot of N-methyl-3-piperidinemethanol in TLC had disappeared. After cooling, 46.3 parts of xylene and 5.4 parts of Cellosolve acetate were added to obtain an amphoteric resinous varnish II. The characteristics of this varnish are shown in Table 1.

EXAMPLE 3

Amphoteric Resinous Varnish III

To 100 parts of acidic resin A obtained in Example 1, were added 0.26 part of N-methyl-3-piperidinemethanol and 0.01 part of FASCAT and the mixture was reacted as in Example 2. After cooling, 45.8 parts of xylene and 5.3 parts of Cellosolve acetate were added to obtain an amphoteric resinous varnish III. The characteristics of this varnish are shown in Table 1.

EXAMPLE 4

Amphoteric Resinous Varnish IV

To 100 parts of acidic resin A obtained in Example 1, were added 9.1 parts of N-methyl-3-piperidinemethanol and 0.1 part of FASCAT4201 and the mixture was reacted as in Example 2. After cooling, 50 parts of xylene and 5.8 parts of Cellosolve acetate were added to obtain an amphoteric resinous varnish IV. The characteristics of this varnish are shown in Table 1.

EXAMPLE 5

Amphoteric Resinous Varnish V 88.6 Parts of coconut oil, 22.1 parts of dehydrated castor oil, 39.9 parts of trimethylolethane and 0.1 part of lithium naphthenate were placed in a reaction tank and the mixture was heated to 240° C. At this temperature, an ester exchange reaction was effected. Then, 38.6 parts of trimethylolethane, 49.9 parts of isophthalic acid, 103.7 parts of phthalic anhydride, 31.6 parts of neopentylglycol, and 7 parts of xylene were added, the mixture was heated to 220° to 230° C. and dehydration reaction was continued until the resinous acid value of 8.0. Thereafter, the reaction mixture was allowed to cool. At the tank temperature of 140° C., 3.8 parts of 3-pyridinemethanol were added and ester exchange reaction was effected at 160° C. until the characteristic spot of 3-pyridinemethanol in TLC had been disappeared. After cooling, 209.5 parts of xylene and 24.1 parts of Cellosolve acetate were added to obtain an amphoteric resinous varnish Y. The characteristics of this varnish are shown in Table 1.

EXAMPLE 6

Amphoteric Resinous Varnish VI

To a reaction tank, were added 40 parts of xylene, 10 parts of Cellosolve acetate, 33.2 parts of methyl methacrylate, 48 parts of ethyl acrylate, 16 parts of 2-hydroxyethyl methacrylate, 1 part of methacrylic acid and 1.8 parts of diethylaminoethyl methacrylate and the mixture was heated to 110° C. While maintaining the same temperature, a solution of 40 parts of xylene, 10 parts of Cellosolve acetate, 1 part of azobisisobutyronitrile and 0.25 part of laurylmercaptane was dropwisely added at a constant speed in 3 hours. Thereafter, the mixture was maintained for 2 hours, added with 2.6 parts of phthalic anhydride and reacted at 140° C. until the resinous acid value of 17.0, to obtain an amphoteric resinous varnish VI. The characteristics of this varnish are shown in Table 1.

EXAMPLE 7

Comparative Acidic Resinous Varnish VII

To 100 parts of acidic resin A obtained in Example 1, were added 45.6 parts of xylene and 5.3 parts of Cellosolve acetate to obtain an acidic resinous varnish VII. The characteristics of this varnish are shown in Table 1.

EXAMPLE 8

Comparative Amphoteric Resinous Varnish VIII

To 100 parts of acidic resin A obtained in Example 1, were added 5 parts of melamine resin U-20SE(non-volatile content 60%, manufactured by Mitsui Tohatsu K. K.) and the mixture was reacted at a tank temperature of 100° C. until the varnish viscosity (Gardner viscosity, 25° C.) of Y, and allowed to cool. The characteristics of thus obtained amphoteric resinous varnish VIII are shown in Table 1. The basic component of this amphoteric resin has a titration midpoint potential of 460 mV, which is outside the scope of of this invention.

TABLE 1

| | Example No. | | | | | | | |
|---|---|---|---|---|---|---|---|---|
| | 1 | 2 | 3 | 4 | 5 | 6 | 7 | 8 |
| Resin. varnish | I | II | III | IV | V | VI | VII | VIII |
| non-volatile % | 65.4 | 64.9 | 65.1 | 64.7 | 60.1 | 51.2 | 65.2 | 64.8 |
| varnish viscosity*[1] | V-W | W | V-W | W-X | U-V | Y-Z | V | Y |
| acidity (m mol/g sol.) | 0.18 | 0.18 | 0.18 | 0.18 | 0.17 | 0.39 | 0.18 | 0.17 |
| tit. midpoint poten. of acid component*[2] | −310 mV | −310 mV | −310 mV | −310 mV | −290 mV | −290 mV | −310 mV | −310 mV |
| basicity (m mol/g sol) | 0.11 | 0.12 | 0.02 | 0.83 | 0.12 | 0.11 | | 0.15 |
| tit. midpoint poten. of basic component*[3] | 387 mV | 382 mV | 382 mV | 382 mV | 430 mV | 380 mV | | 460 mV |

*[1]Gardner viscosity 25° C.
*[2]Sample was dissolved in pyridine, quantitatively analyzed by means of non-aqueous potentiometric titration with a titer of n-tetrabutylammonium hydroxide, and acidity was determined from the molar volume of the titer required neutralization thereof. The potential at the titration midpoint of this titration curve was used as titration midpoint of acidic component.
*[3]Sample was dissolved in acetic acid, quantitative analyzed by means of non-aqueous potentiometric titration with a titer of perchloric acid, and basicity was determined from the molar volume of the titer required for neutralization thereof. The potential at the titration midpoint of this titration curve was used as titration midpoint potential of basic component.

EXAMPLE 9

A white colored dispersion paste was prepared using the amphoteric resinous varnish I obtained in Example 1 and following the receipt shown in the following Table A-1:

TABLE A-1

| | | |
|---|---|---|
| titanium white (Note 1) | 60 | parts |
| amphoteric resinous varnish I | 27 | |
| Solvesso 100 (Note 2) | 15 | |
| dispersing agent (Note 3) | 0.05 | |
| total | 102.05 | |

Thereafter, a white primary color coating composition was prepared by mixing the following:

TABLE A-2

| | |
|---|---|
| white colored dispersion paste | 102.05 |
| amphoteric resinous varnish I | 42.0 |
| melamine resin (Note 4) | 32.0 |
| n-butanol | 5.0 |
| triethylamine | 0.6 |
| total | 181.65 |

(Note 1): Titanium R5N manufactured by Sakai Kagaku K.K.
(Note 2): mixed solvent by Esso Standard Co.
(Note 3): 10% solution of KF-69 manufactured by Shinetsu Silicon K.K.
(Note 4): Super Beckamine 16-508 manufactured by Dainippon Ink K.K.

The obtained white primary color coating composition was flow-coated on a glass plate and baked, by using a hot air dryer, at 140° C. for 30 minutes. TI value of the white colored dispersion paste and 20° gloss of the baked coating were measured and pigment dispersablity was evaluated. The results are shown in Table 2.

EXAMPLE 10 AND 11

An orange colored and a red colored dispersion paste were prepared with the receipts shown in Table B-1 and C-1, and thereafter an orange primary color and a red primary color coating compositions were prepared by mixing the materials shown in Table B-2 and Table C-2, respectively.

TABLE B-1

| | | |
|---|---|---|
| Novaperm orange HL-70*[1] | 35 | parts |
| amphoteric resinous varnish I | 27 | |
| Solvesso 100 | 40 | |
| dispersing agent | 0.05 | |
| total | 102.05 | |

TABLE B-2

| | |
|---|---|
| orange dispersion paste | 102.05 |
| amphoteric resinous varnish I | 42.0 |
| melamine resin | 32.0 |
| n-butanol | 5.0 |
| triethylamine | 0.5 |
| total | 181.55 |

*[1]benzimidazolone series, by Hoechst

TABLE C-1

| | |
|---|---|
| Cinquacia red Y-RT 759D**[1] | 35 |
| amphoteric resinous varnish I | 27 |
| Solvesso 100 | 40 |
| dispersing agent | 0.05 |
| total | 102.05 |

TABLE C-2

| | |
|---|---|
| red colored dispersion paste | 102.05 |
| amphoteric resinous varnish I | 42.0 |
| melamine resin | 32.0 |
| n-butanol | 5.0 |
| triethylamine | 0.5 |
| total | 181.55 |

**[1]quinacridone series, by Du Pont

Ti values of said orange colored and red colored dispersion pastes and 20° glosses of the baked coatings were evaluated as in Example 9. The test results are shown in Table 2.

EXAMPLES 12 TO 20

Using amphoteric resinous varnish II of Example 2, amphoteric resinous varnish III of Example 3 or amphoteric resinous varnish IV of Example 4 in place of the resinous varnish I in Tables A,B and C in Examples 9 to 11, the respective white primary colored, orange primary colored and red primary colored coating compositions were prepared. TI values of the respective dispersion paste and 20° gloss of the baked coating were measured and pigment dispersibility was evaluated, in each case. The test results are shown in Table 2.

EXAMPLES 21 TO 23

Using amphoteric resinous varnish V of Example 5 in place of amphoteric resinous varnish I in Tables A,B and C appearing in Examples 9 to 11, but changing the amounts "27" to "29" and "42" to "46", the respective white primary colored, orange primary colored and red primary colored coating compositions were prepared. TI values of thus obtained dispersion pastes and 20° gloss of the baked coatings were measured and the pigment dispersibilities were evaluated. The test results are shown in Table 2.

EXAMPLES 24 TO 26

Using amphoteric resinous varnish VI of Example 6 in place of amphoteric resinous varnish I in Tables A,B and C appearing in Examples 9 to 11, but changing the amounts "27" to "35" and "42" to "55", the respective white primary colored, orange primary colored and red primary colored coating compositions were prepared. TI values of thus obtained dispersion pastes and 20° glosses of the baked coatings were measured and pigment dispersibilities were evaluated. The test results are shown in Table 2.

EXAMPLES 27 TO 32 (Comparative Examples)

Using amphoteric resinous varnish VII of Example 7 or amphoteric resinous varnish VII of Example 8 in place of the resinous varnish I in Tables A,B and C in Examples 9 to 11, the respective white primary colored, orange primary colored and red primary colored coating compositions. TI values of the obtained dispersion pastes and 20° glosses the the primary colored coating compositions were measured and pigment dispersibilities were evaluated. The results are shown in Table 2.

As is clear from the test results shown in Table 2, the present resinous composition can exhibit far better pigment dispersibility especially to hard dispersible pigments.

TABLE 2

| Example | | | | | | | | | | | | |
|---|---|---|---|---|---|---|---|---|---|---|---|---|
| 9 | 10 | 11 | 12 | 13 | 14 | 15 | 16 | 17 | 18 | 19 | 20 |

TABLE 2-continued

| resinous varnish | I | I | I | II | II | II | III | III | III | IV | IV | IV |
|---|---|---|---|---|---|---|---|---|---|---|---|---|
| primary color | W | O | R | W | O | R | W | O | R | W | O | R |
| 20° gloss | 84 | 72 | 71 | 89 | 78 | 76 | 82 | 70 | 69 | 86 | 78 | 78 |
| TI value* | 1.2 | 2.4 | 3.0 | 1.1 | 1.8 | 2.7 | 1.2 | 2.6 | 3.8 | 1.1 | 1.6 | 2.6 |

| | Example | | | | | | | | | | | |
|---|---|---|---|---|---|---|---|---|---|---|---|---|
| | 21 | 22 | 23 | 24 | 25 | 26 | 27 | 28 | 29 | 30 | 31 | 32 |
| resinous varnish | V | V | V | VI | VI | VI | VII | VII | VIII | VIII | VIII | VIII |
| primary color | W | O | R | W | O | R | W | O | R | W | O | R |
| 20° gloss | 82 | 68 | 66 | 86 | 70 | 72 | 72 | 15 | 5< | 81 | 66 | 51 |
| TI value | 1.3 | 3.0 | 4.2 | 1.2 | 2.8 | 3.1 | 1.8 | 5.4 | 7.7 | 1.4 | 3.2 | 5.6 |

*viscosity ratio at 6 r.p.m and 60 r.p.m., BM type viscometer No. 3 rotor
W = white primary color
O = orange primary color
R = red primary color

What is claimed is:

1. A resinous composition for coating use having a greatly improved pigment dispersibility and comprising an amphoteric resin having an acidic resinous component and a basic component of a basic compound, and aminoformaldehyde resin etherified with monohydric alcohol having 1 to 4 carbon atoms, an isocyanate compound or mixture of said amino-formaldehyde resin and isocyanate compound, wherein the basic component of said amphoteric resin consists of basic compound whose titration midpoint potential in non-aqueous potentiometric titration, when incorporated into the resin, is less than 450 mV, and the basicity of the amphoteric resin is within the range of $1.0 \times 10^{-2}$ m mol/g solid.

2. The resinous composition according to claim 1 comprising 45 to 95% by weight of said amphoteric resin and 55 to 5% by weight of said amino-formaldehyde resin, isocyanate compound or mixture therof.

3. The resinous composition according to claim 1 wherein the acidic resinous component of the amphoteric resin consists of polycarboxylic acid whose titration midpoint potential in non-aqueous potentiometric titration, under the condition capable of developing a resinous acid value, is more than $-350$ mV and the acidity of said amphoteric resin is within the range of $2.0 \times 10^{-2}$ to 3.0 m mol/g solid.

4. The resinous composition according to claim 2 wherein the acidic resinous component of the amphoteric resin consists of polycarboxylic acid whose titration midpoint potential in non-aqueous potentiometric titration, under the state capable of developing resinous acid value, is more than $-350$ mV and the acidity of said amphoteric resin is within the range of $2.0 \times 10^{-2}$ to 3.0 m mol/g solid.

5. The resinous composition according to claim 1 wherein there is additionally employed in combination therewith quinacridone pigment.

* * * * *